UNITED STATES PATENT OFFICE.

WILLIAM R. CLOUGH, OF NEWARK, NEW JERSEY.

IMPROVEMENT IN THE MANUFACTURE OF SEALING-WAX.

Specification forming part of Letters Patent No. 172,391, dated January 18, 1876; application filed June 14, 1875.

*To all whom it may concern:*

Be it known that I, WM. R. CLOUGH, of Newark, Essex county, New Jersey, have invented an Improvement in the Manufacture of Sealing-Wax, of which the following is a specification:

My invention relates to the manufacture of sealing-wax, the object of which is to improve upon the method now employed, and to lessen the expense thereof, by producing with the same materials a greatly superior grade of wax to that made in the ordinary manner; and it is effected by so dividing or distributing the component parts of the compound from which the wax is made that the more adhesive materials shall be concentrated into one body or mass, while the poorer or less expensive materials constitute the remaining portion of the compound, the whole forming one integral stick or piece of wax. The materials are compounded and melted in the usual manner, but in separate parts, and so united, in forming the sticks or cakes, as to preserve the identity or individuality of each part.

It is obvious that there are various ways of manipulating the materials to secure the above result. I have found the following to be a very practical plan: First form a stick, of any desired form or size, from the poorer materials of the proposed compound. When this has sufficiently cooled, immerse it in a dip or solution composed of the remaining or more adhesive portion of said compound. Withdraw the stick immediately, and to the surface will have adhered a layer or enamel of the desired preparation.

It will be found, in making seals of wax so made, that enough of the adhesive enamel comes into close contact with the object sealed to hold the seal firmly, while the more inexpensive portion or center of the stick forms the body of the seal, thus effecting the desired result equally as well as when the whole stick is composed of the more expensive materials.

This process may be varied by throwing the more adhesive materials into the center of the piece, as by a small core running through the stick, if desirable, the main point being to concentrate the adhesive materials into a body or bodies by themselves in forming the pieces of wax.

If desired, the color for the wax may be excluded from one division and put into the other—as, for instance, the enamel may contain all the coloring-matter, which gives a greater brilliancy to the appearance of the wax, both in the piece or stick and in the seal, than when distributed equally through the compound.

Having thus described my invention, what I claim, and desire to secure by Letters Patent, is—

The process of manufacturing sealing-wax, which consists in separately forming the less and the more adhesive portions of wax and uniting them without mingling them, substantially as and for the purpose described.

W. R. CLOUGH.

Witnesses:
R. G. HUTCHINSON,
R. W. BRACKLON.